United States Patent [19]

Babcock et al.

[11] 4,390,819
[45] Jun. 28, 1983

[54] TELEVISION RECEIVER FERRORESONANT POWER SUPPLY USING A TWO-MATERIAL MAGNETIZABLE CORE ARRANGEMENT

[75] Inventors: William E. Babcock, Warren; Frank S. Wendt, Princeton, both of N.J.

[73] Assignee: RCA Corporation, New York, N.Y.

[21] Appl. No.: 250,130

[22] Filed: Apr. 2, 1981

[51] Int. Cl.³ .............................................. H01J 29/70
[52] U.S. Cl. .................................... 315/411; 358/190; 336/212
[58] Field of Search ................ 323/306, 307; 336/212; 363/75; 315/411; 358/190

[56] References Cited

U.S. PATENT DOCUMENTS

| | | | |
|---|---|---|---|
| 1,698,634 | 1/1929 | Johannesen | 336/212 |
| 3,034,987 | 5/1962 | Baltzer | 252/62.5 |
| 3,662,307 | 5/1972 | Tsukuda et al. | 336/178 |
| 3,663,913 | 5/1972 | Kato et al. | 336/212 X |
| 3,739,255 | 6/1973 | Leppert | 336/212 X |
| 4,088,942 | 5/1978 | Miko | 323/60 |
| 4,183,079 | 1/1980 | Wachi | 336/212 X |
| 4,319,167 | 3/1982 | Wendt | 315/411 |

FOREIGN PATENT DOCUMENTS

| | | | |
|---|---|---|---|
| 3003321 | 7/1980 | Fed. Rep. of Germany | 315/411 |
| 2041668A | 9/1980 | United Kingdom | 315/411 |

Primary Examiner—Theodore M. Blum

Attorney, Agent, or Firm—E. M. Whitacre; P. J. Rasmussen; Joseph Laks

[57] ABSTRACT

A high voltage ultor power supply for a television receiver includes a ferroresonant transformer that is capable of operating over a substantial range of temperature without thereby introducing undesirably large changes in the ultor voltage. The ferroresonant transformer comprises a plurality of windings, a magnetizable core with first and second core sections, and a resonating capacitor. A first of the plurality of windings is wound on the first core section and coupled to a source of exciting current for generating magnetic flux in the core. A second of the plurality of windings is wound on the second core section. The varying magnetic flux that links the second winding generates an alternating polarity output voltage across that winding. To regulate the output voltage, the capacitor is coupled to one of the plurality of windings and develops a circulating current to produce a magnetic flux that aids in magnetically saturating the second core section. The first core section is operated in the magnetically unsaturated or linear region of the B-H loop characteristic of the magnetizable material forming the first core section. A high voltage circuit, responsive to the regulated output voltage, develops the television receiver ultor voltage. The material of the magnetically saturating second core section is selected to have a higher Curie temperature than that of the nonsaturating first core section, resulting in relatively small temperature dependent changes of the ultor voltage.

22 Claims, 7 Drawing Figures

TELEVISION RECEIVER FERRORESONANT POWER SUPPLY USING A TWO-MATERIAL MAGNETIZABLE CORE ARRANGEMENT

This invention relates to ferroresonant power supplies for television receivers.

Ferroresonant transformers are known which provide regulated ultor voltages and regulated B+ scanning voltages for television receivers. One such television receiver ferroresonant power supply is described in a U.S. patent application of F. S. Wendt, Ser. No. 144,150, filed Apr. 28, 1980, entitled "HIGH FREQUENCY FERRORESONANT POWER SUPPLY FOR A DEFLECTION AND HIGH VOLTAGE CIRCUIT", now U.S. Pat. No. 4,139,167. When operated at relatively high input frequencies, such as the horizontal deflection frequency of around 16 KHz, a ferroresonant transformer is a relatively compact, low weight unit which provides inherent output voltage regulation without the necessity of relatively complex and expensive electronic regulator control circuitry.

To provide reasonably good efficiencies at the high operating frequencies of a 16 KHz ferroresonant transformer, the magnetizable core of the transformer may be formed from a high resistivity magnetizable material such as ferrite. Ferrite materials generally exhibit a high resistance to current, thereby incurring relatively small eddy current losses which otherwise would be excessive at the relatively high 16 KHz operating frequency. Hysteresis losses are also relatively low. Even when using a ferrite core, eddy current losses and hysteresis losses in the core and $I^2R$ losses produced by the resonant current in the capacitor coupled winding of the ferroresonant transformer may produce a substantial rise above ambient in the saturating core.

The saturation flux density, Bsat, of many magnetizable materials decreases with increasing core temperature. For manganese-zinc ferrites, the saturation flux density may decrease from about 4.4 kilogauss at 20° C. to 2.5 kilogauss at 150° C. Since the output high voltage of a ferroresonant transformer depends in part on the Bsat value of the saturating core material, a rise in saturating core operating temperature and the consequent reduction in Bsat may undesirably result in a decrease in the high voltage winding and ultor terminal voltages.

As an illustration of a relatively large temperature dependent change in ultor voltage that may occur in a ferroresonant high voltage transformer power supply generating the television receiver ultor voltage, consider the example of a ferroresonant high voltage transformer with a magnetizable core formed entirely of the same material, such as a manganese-zinc ferrite, and with the transformer primary winding wound around a nonsaturating primary core leg and the regulated high voltage secondary winding wound around a magnetically saturating, opposing secondary core leg. The manganese-zinc ferrite forming the entire ferroresonant transformer core material may be a commercially available one, such as RCA 540 ferrite, manufactured by RCA Corporation, Indianapolis, Ind. and used as the core material for the flyback transformer in an RCA color television chassis, CTC-85.

Figure 2:
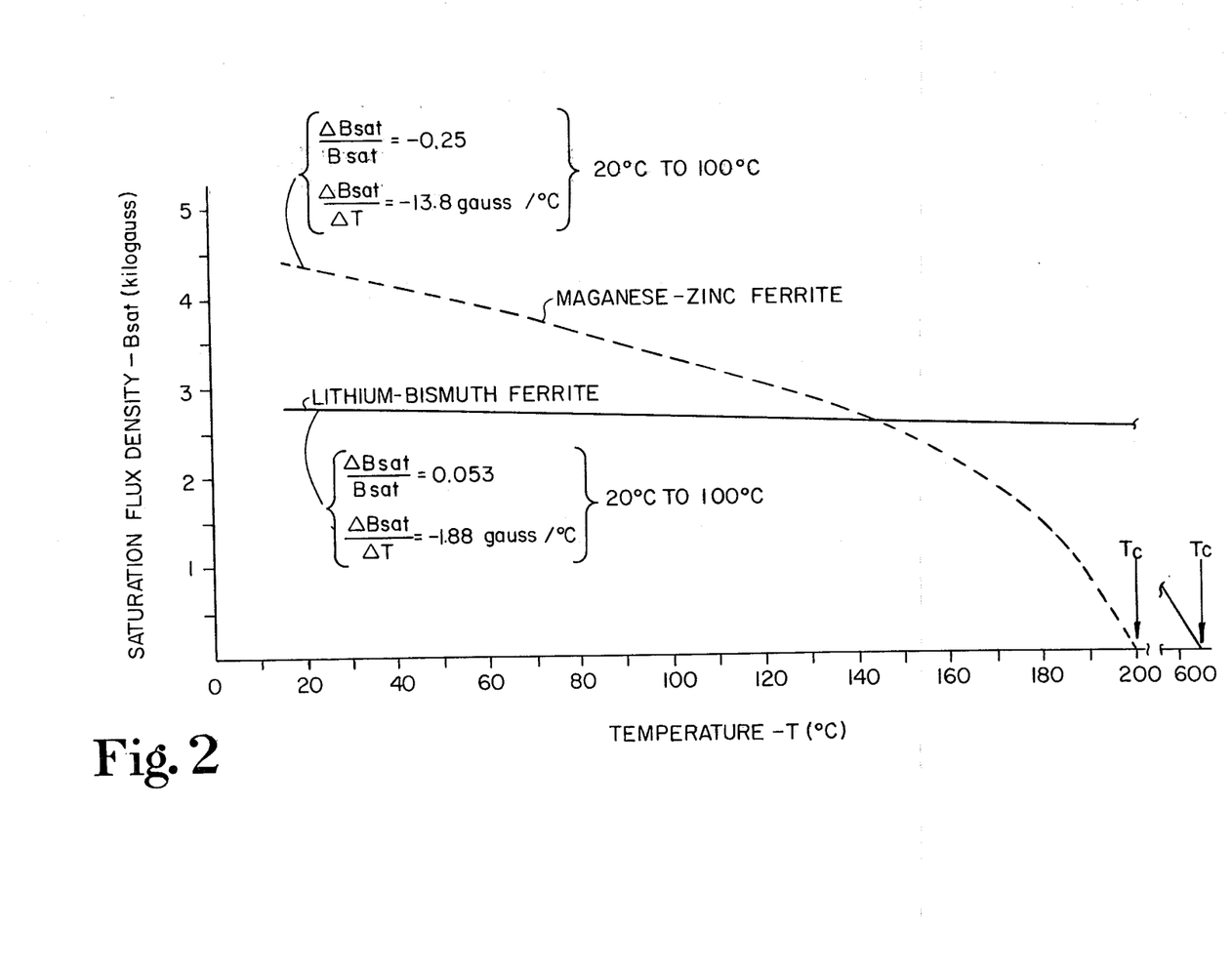
FIGS. 2-5 illustrate curves associated with the operation of the power supply of FIG. 1.

The temperature dependence of the saturation flux density, Bsat, of a manganese-zinc ferrite, such as RCA 540 ferrite, is illustrated by the dashed-line curve of FIG. 2. The Curie temperature, Tc, at which the Bsat of the manganese-zinc ferrite reaches zero, is about 200° C. In the temperature range of 20° C. to 100° C., the saturation flux density decreases from 4.4 kilogauss to 3.3 kilogauss, or a decrease in Bsat with temperature of $\Delta Bsat/\Delta T = -13.8$ gauss/°C. Furthermore, and just as important, the fractional change in Bsat, $\Delta Bsat/Bsat = -0.25$, in the temperature range 20° C. to 100° C.

The ultor voltage, derived from the regulated voltage developed across the high voltage winding of the ferroresonant transformer, is approximately proportional to the Bsat of the core material inside the saturating high voltage winding. Thus, the fractional change with temperature in saturation flux density $\Delta Bsat/Bsat$ is an indication of the amount of ultor voltage change with saturating core temperature change. For a ferroresonant high voltage transformer with a magnetizable core formed entirely of illustratively manganese-zinc ferrite, a fractional change in saturation flux density of $-0.25$ may produce a relatively large fractional change in ultor voltage $\Delta U/U$. As illustrated by the dashed-line curve M of FIG. 3, the ultor voltage U derived from a ferroresonant high voltage transformer decreases from 32 kilovolts when the operating temperature in the saturating core is 20° C. to an ultor voltage of 26.2 kilovolts when the core temperature is 100° C. or a fractional change $\Delta U/U = -0.18$.

Assuming that the equilibrium or steady-state operating temperature of the saturating core portion of the ferroresonant high voltate transformer is in the neighborhood of 50° C. above ambient temperature, a core operating temperature range of 20° C. to 100° C. represents an ambient temperature range of $-30°$ C. to $+50°$ C. within which the television receiver is expected to operate. It may be undesirable to use a ferroresonant high voltage transformer having a relatively large change in ultor output voltage versus temperature. When a raster first appears on the screen of the picture tube after the receiver is turned on, the electron beam at beginning and end of horizontal and vertical scan should be deflected completely off the viewable screen area. Since, with a fixed value of horizontal and vertical deflection current, raster size increases with decreasing ultor voltage, a large percentage change in ultor voltage with temperature may result in an excessive amount of overscan after television receiver warm-up.

Alternatively to overscanning, raster width, for example, may be maintained relatively constant by concurrently decreasing the B+ scan supply voltage with the decrease in ultor voltage. If B+ scan supply voltage is derived from an output winding on the saturating core portion of the ferroresonant high voltage transformer, a large fractional change in ultor voltage with temperature may impose severe design constraints on the ferroresonant transformer to enable the B+ scan supply voltage to properly track the ultor voltage changes. If the B+ scan supply voltage is derived by other means, then relatively complex and costly electronic circuitry may be required to provide the B+ tracking function.

Figure 3:
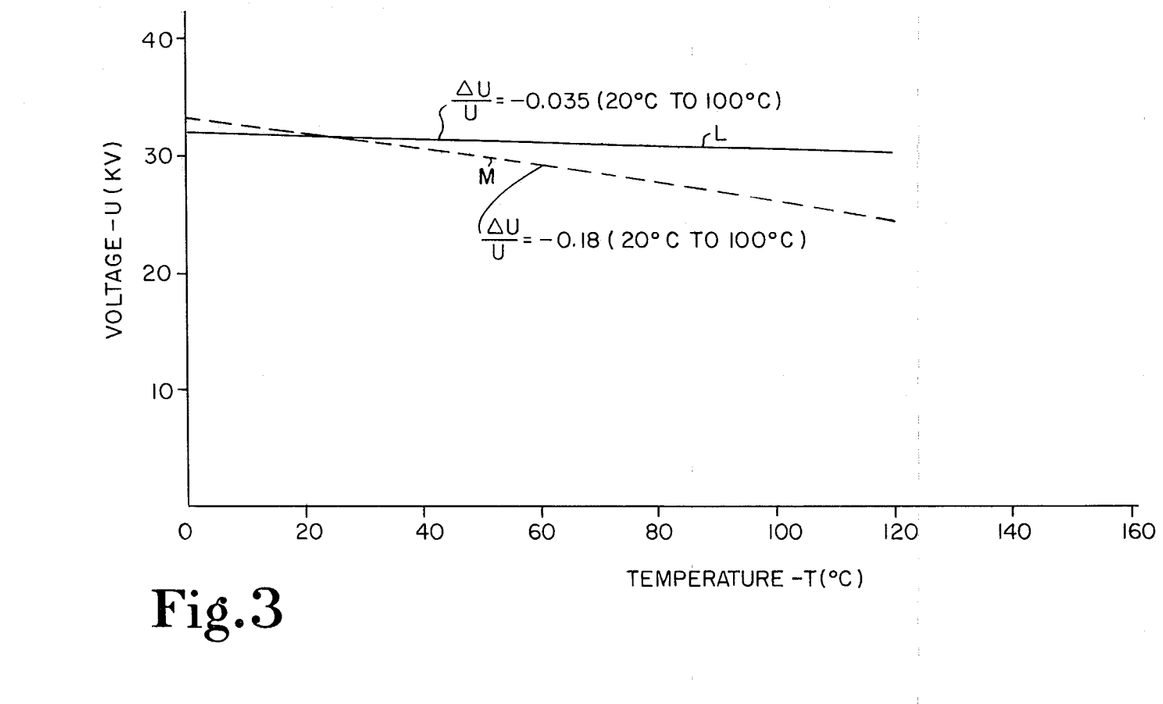

Large ultor voltages, of illustratively 30 kilovolts, may be desirable so as to obtain high brightness displays on the picture tube phosphor screen and small spot size for high resolution. Excessive fractional change of ultor voltage over the television receiver ambient operating temperature range may result in too low an ultor voltage at the high end of the temperature range. As illustrated in FIG. 3, curve M, the ultor voltage at a saturating core operating temperature of 100° C. is approximately 26 kilovolts compared to an ultor voltage of 32 kilovolts at 20° C. Such a temperature-induced decrease in ultor voltage may be taken into account by designing the ferroresonant high voltage transformer to provide a 30 kilovolt ultor voltage even at the higher core operating temperatures.

If the ferroresonant high voltage transformer were to be designed to provide 30 KV ultor voltage at a saturating core operating temperature of 100° C., at an ambient temperature of about 25° C., then in a colder environment, where the saturating core equilibrium operating temperature is only 20° C., for example, the ultor voltage that would be developed would be 4 to 6 kilovolts greater than that indicated in FIG. 3, curve M. An ultor voltage of 36 to 38 kilovolts may be undesirable, as such a voltage may approach the threshold ultor voltage level above which the amount of X-radiation emitted by the phosphor particles and other material in the picture tube may be unacceptably large.

Other problems may be encountered when using a ferroresonant high voltage transformer designed with a one-material core formed entirely of a high temperature drift ferrite such as manganese-zinc ferrite. As illustrated in the dashed-line curve MT of FIG. 4, immediately after the television receiver is turned on, near time $t_0$, the temperature of the core of the ferroresonant high voltage transformer is at an ambient temperature of, illustratively, 25° C. As illustrated by the dashed-line waveform MV, the ultor voltage being developed by the ferroresonant high voltage transformer at turn-on, near time $t_0$, is approximately 32 kilovolts.

Figure 4:
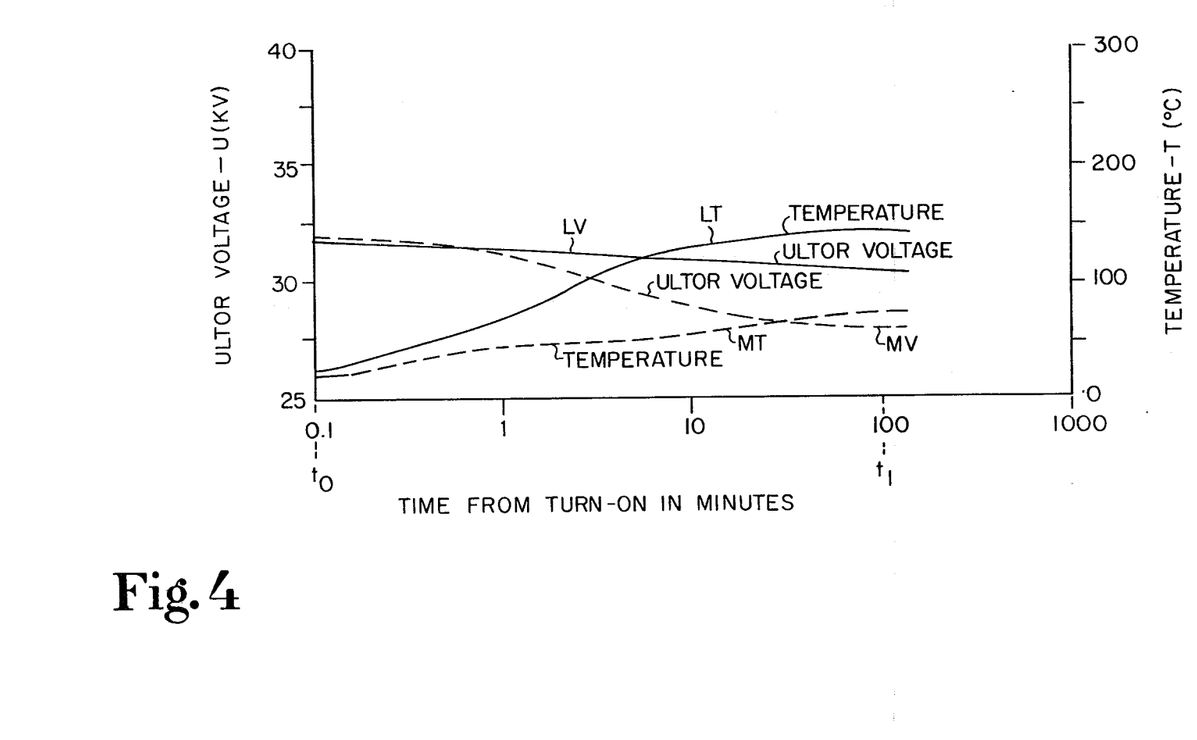

After turn-on of the television receiver, the saturating core portion of the ferroresonant high voltage transformer begins to heat up until an equilibrium or steady-state operating temperature is established, near time $t_1$ of FIG. 4. The saturating core portion heats up because of induced eddy currents and hysteresis losses. Heating up of the saturating core portion also results from heat transfer to the core portion from the transformer winding in which the circulating currents flow that are produced by the resonant capacitor.

As illustrated by the dashed-line curve MT of FIG. 4, the saturating core portion of the ferroresonant transformer heats up to about 55° C. above ambient to an equilibrium operating temperature of about 75° C. As illustrated by the dashed-line curve MV, the ultor voltage decreases from 32 KV at turn-on of the television receiver to around 26 KV when the equilibrium operating temperature is reached at time $t_1$. Such a relatively large change in ultor voltage from television receiver turn-on until the equilibrium operating temperature has been reached may be undesirable.

In the concurrently filed U.S. patent application of R. Shahbender et al., Ser. No. RCA 76,945, entitled "TELEVISION RECEIVER FERRORESONANT HIGH VOLTAGE POWER SUPPLY USING TEMPERATURE STABLE CORE MATERIAL", there is taught the use of lithium ferrite or substituted lithium ferrite as a ferroresonant saturable reactor or ferroresonant transformer magnetizable core material. Lithium ferrite when appropriately manufactured has the beneficial properties, when used in a ferroresonant power supply, of having a relatively small fractional change in saturation flux density per degree centigrade, thereby providing a relatively temperature stable output voltage.

A feature of the invention is the design of a ferroresonant power supply that uses a relatively temperature stable saturating core material, while providing substantial flexibility in the power supply design with respect to other parameters not directly associated with the saturating core portion of the power supply.

The power supply in accordance with the invention includes a saturable reactor having a magnetizable core and an output winding located on the core. An exciting current for the saturable reactor is developed from a source of input voltage and generates a magnetic flux in the magnetizable core that links the output winding, thereby developing an alternating polarity output voltage across the output winding. A capacitance is coupled to a winding located on the magnetizable core for generating a magnetic flux in the core section associated with the output winding. The capacitance generated magnetic flux aids in magnetically saturating the associated core section to regulate the alternating polarity output voltage. Another core section of the magnetizable core is operated in the substantially linear region of the B-H characteristic of that core section material. The magnetizable material of the magnetically saturating core section is selected to be a material having a smaller fractional change in saturation flux density than that of the material of the linear region operated core section within the range of temperatures that exists in the saturating core section during operation of the power supply.

The magnetizable material of the magnetically saturating core section may be formed, illustratively, of a lithium ferrite, whereas the material of the linear region operated core section may be formed of a ferrite other than lithium ferrite, such as manganese-zinc ferrite. Many lithium ferrites have higher Curie temperatures than do manganese-zinc ferrites. Generally, for two different ferrites having Bsat values that do not differ greatly at a given operating temperature of, for example, 70° C., the ferrite with a higher Curie temperature has the smaller fractional change of Bsat for a typical transformer saturating core section operating temperature range of, for example, 20° C. to 100° C.

Figure 1:
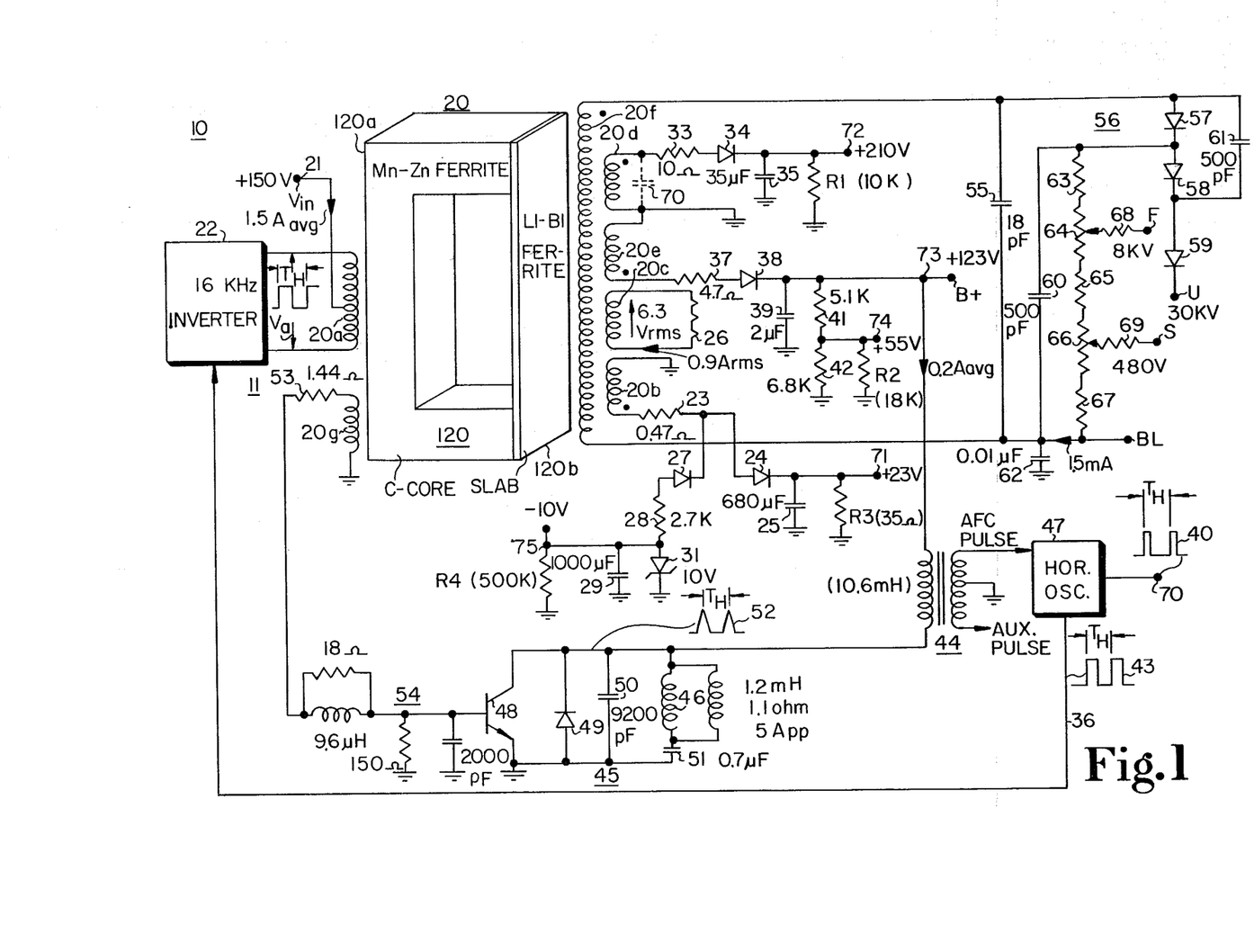
FIG. 1 illustrates a television receiver ferroresonant deflection and high voltage power supply embodying the invention.

In FIG. 1, a ferroresonant deflection and high voltage power supply 10 provides regulated, low DC supply voltages at terminals 71–75 for various television receiver load circuits, including a B+ scan supply voltage at terminal 73 for a horizontal deflection generator 45. Ferroresonant power supply 10 also provides a regulated DC ultor voltage or accelerating potential at a terminal U for a television receiver picture tube, not illustrated.

A source 11 develops an unregulated alternating input voltage $V_a$ across the primary winding 20a of a ferroresonant transformer 20. Voltage source 11 comprises an inverter 22 coupled to the end terminals of the ferroresonant transformer primary winding 20a and a DC input terminal 21 coupled to a center tap of primary winding 20a. Inverter 22 may be operated at the horizontal deflection frequency, $1/T_H$, to develop the alternating input voltage $V_a$ repeating at the same frequency, or inverter 22 may be operated at a frequency greater than the horizontal deflection frequency to reduce overall transformer size.

Primary winding 20a of ferroresonant transformer 20 is wound around the primary core section or leg 120a of a magnetizable core 120. Secondary output windings 20b-20f are located on and wound around an opposing leg or secondary core section 120b. Alternating input voltage source 11 generates an exciting current in primary winding 20a. The exciting current generates a varying magnetic flux in the magnetizable core 120. The varying magnetic flux that links the secondary output windings 20b-20f induces thereacross alternating polarity output voltages.

To regulate the secondary voltages across output windings 20b-20f against changes in input voltage $V_a$ and against changes of loading on the output windings, the secondary core section 120b, associated with the output windings, is substantially magnetically saturated during each polarity interval of the alternating polarity output voltage. A resonant capacitor 55 is coupled across one of the output windings, illustratively output winding 20f, to generate, in conjunction with the distributed capacitance of winding 20f, a circulating or resonant current in winding 20f that produces a magnetic flux that aids in the magnetic saturation of the secondary core section. Alternatively, a resonating capacitor 70 may be coupled across a different secondary winding, such as winding 20d. To further aid in producing a substantially saturated secondary core section 120b, the cross-sectional area of secondary core section 120b may be relatively small and of reduced cross-sectional area when compared to the cross-sectional area of primary core section 120a.

The regulated alternating polarity output voltage developed across secondary winding 20b is rectified by a diode 24 and filtered by a capacitor 25 to develop a regulated DC supply voltage at terminal 71 of, illustratively, +23 volts DC. A current limiting resistor is coupled between winding 20b and diode 24. The +23 volt DC supply voltage energizes such television receiver load circuits as the vertical deflection circuit and the audio circuit, collectively illustrated in FIG. 1 as a resistor R3.

The anode of a 10 volt zener diode 31 is coupled to supply terminal 75 to develop a −10 volt DC supply voltage thereat. A filter capacitor 29 is coupled across zener diode 31. Biasing of zener diode 31 is accomplished by coupling the anode of the zener diode through a resistor 28, a diode 27 and resistor 23 to secondary output winding 20b, with the cathode of diode 27 being coupled to resistor 23. The −10 volt DC supply voltage provides a DC level shifting voltage for the tuner RF AGC circuit.

The heater filaments for the cathode electrodes of the television receiver color picture tube are energized by the voltage developed across secondary output winding 20c.

The regulated voltage across secondary output winding 20d is rectified by a diode 34 and filtered by a capacitor 35 to develop a regulated DC voltage at terminal 72 of, illustratively, +210 volts DC. A current limiting resistor 33 is coupled between winding 20d and diode 34. The +210 volt DC supply voltage energizes such television receiver load circuits as the picture tube driver circuits, collectively illustrated in FIG. 1 as a resistor R1.

The regulated voltage developed across secondary output winding 30e is rectified by a diode 38 and filtered by a capacitor 39 to develop a regulated DC supply voltage at terminal 73 of, illustratively, +123 volts DC. A voltage divider comprising resistor 41 and 42 is coupled to supply terminal 73 and divides down the +123 volts to develop +55 volts DC at terminal 74, the junction terminal of resistors 41 and 42. The +55 volt DC supply voltage energizes such television receiver load circuitry as the vertical retrace circuit, generally illustrated in FIG. 1 as a resistor R2.

The voltage at supply terminal 73 also serves as the regulated B+ scan supply voltage for horizontal deflection generator 45. Horizontal deflection generator 45 is coupled to B+ terminal 73 through a transformer choke 44. Generator 45 comprises a horizontal output transistor 48, a damper diode 49, a retrace capacitor 50, and the series arrangement of a horizontal deflection winding 46 and an S-shaping or trace capacitor 51. In response to periodic, horizontal rate switching of horizontal output transistor 48, horizontal scanning current is developed in deflection winding 46.

A horizontal rate drive voltage to provide the required periodic switching action of output transistor 48 is developed across a winding 20g tightly coupled magnetically with primary winding 20a. The drive voltage developed across winding 20g is applied to the base of transistor 48 through a current limiting resistor 53 and a waveshaping network 54.

To provide horizontal scanning synchronization of deflection generator 45, horizontal scanning information, in the form of retrace pulses 52 being developed at the collector of output transistor 48, is applied through transformer 44 to the AFC portion of a horizontal oscillator 47. Horizontal sync pulses 40 being developed at a terminal 70 are also applied to the AFC portion of horizontal oscillator 47. The output of horizontal oscillator 47 is a horizontal rate signal 43 synchronized in phase and frequency with horizontal sync pulses 40. The synchronized horizontal rate signal 43 is then applied to inverter 22 along a signal line 36 to synchronize the inverter operation and the switching of horizontal output transistor 48.

Secondary output winding 20f serves as the high voltage winding of ferroresonant transformer 20. The dotted terminal of high voltage winding 20f is coupled to a high voltage rectifier arrangement comprising a high voltage tripler, multiplier circuit 56. The undotted terminal of winding 20f is coupled to a terminal BL, the input terminal of a conventional beam current limiter circuit, not illustrated. A filter capacitor 62 is coupled to terminal BL. High voltage tripler 56 comprises diodes 57-59 and capacitors 60 and 61. Diodes 57 and 59 conduct within the interval that the dotted terminal of winding 20f is positive relative to the undotted terminal to charge, respectively, capacitor 60 and the ultor capacitance, not ilustrated, that is coupled to terminal U. During the opposite polarity interval, diode 58 conducts to charge capacitor 61.

Coupled between the junction of diodes 57 and 58 and terminal BL is a voltage divider comprising resistors 63-67. A terminal F is coupled to the wiper arm of resistor 64 through a resistor 68 for applying an intermediate high voltage to the focus electrode of the picture tube. A terminal S is coupled to the wiper arm of resistor 66 through a resistor 69 to apply a screen voltage to the screen electrode of the picture tube.

During each polarity interval of the alternating polarity output voltages developed across secondary output windings 20b-20f, secondary core section 120b substantially saturates magnetically. Thus, during each cycle of the alternating polarity output voltages, the magnetic operating point of the magnetizable material of the secondary core section 120b traverses almost the entire major B-H loop that is characteristic of the magnetizable material of core section 120b. Hysteresis and eddy current losses occurring during each traverse produce a heating of the saturating core section 120b. Additional heating of the core section occurs by heat transfer to the core section from output winding 20f, which winding is subject to I²R heating by the circulating current therein.

A feature of the invention is the use of a two-material magnetizable core in a ferroresonant ultor power supply. A suitable magnetizable material for the secondary core section 120b of the ferroresonant high voltage transformer 20 is a lithium ferrite with bismuth oxide additive, hereinafter referred to as lithium-bismuth ferrite, and described in the copending U.S. patent application of I. Gordon, Ser. No. RCA 75,551, entitled "IMPROVED LITHIUM FERRITE AND METHOD OF MANUFACTURE", herein incorporated by reference. A suitable magnetizable material of the primary core section 120a is a manganese-zinc ferrite.

The solid line curve of FIG. 2 illustrates the variation in saturation flux density Bsat with temperature of a lithium-bismuth ferrite, such as the lithium-bismuth ferrite described in the aforementioned U.S. patent application of I. Gordon. As illustrated in FIG. 2, the change in Bsat with temperature, $\Delta Bsat/\Delta T = -1.88$ gauss/°C. for lithium-bismuth ferrite within the temperature range 20° C. to 100° C. In contrast, the manganese-zinc ferrite has a higher $\Delta Bsat/\Delta T = -13.8$ gauss/°C. within the same temperature range.

Furthermore, the Curie temperature $T_C$ of lithium-bismuth ferrite is much higher than manganese-zinc ferrite, with lithium-bismuth ferrite having a $T_C$ of about 600° C. In general, for two different ferrites, the one that has a much higher Curie temperature will also have the smaller fractional change in Bsat with temperature over a typical operating temperature range of 20° C. to 100° C. Thus, for example, lithium-bismuth ferrite, which has a Curie temperature of about 600° C., has a much smaller change in Bsat with temperature, $\Delta Bsat/\Delta T$, in the temperature range 20° C. to 100° C. than does manganese-zinc ferrite which has the lower Curie temperature of 200° C. As may be computed from the curves of FIG. 2, the change in Bsat with temperature, $\Delta Bsat/\Delta T$, for lithium-bismuth ferrite is 7.3 times smaller than that of manganese-zinc ferrite.

Because lithium-bismuth ferrite has a more temperature stable Bsat value, the fractional change in Bsat, $\Delta Bsat/Bsat$, over a typical temperature range of 20° C. to 100° C. is also significantly less than that of manganese-zinc ferrite over the same temperature range, even though the actual magnitudes of saturation flux density within this temperature range are lower for lithium-bismuth ferrite than for manganese-zinc ferrite. As may be computed from the curves of FIG. 2, the fractional change in Bsat, $\Delta Bsat/Bsat = -0.053$ for lithium-bismuth ferrite and $\Delta Bsat/Bsat = -0.25$ for manganese-zinc ferrite. Thus, the fractional change in Bsat for lithium-bismuth ferrite is about 4.7 times less than the fractional change in Bsat for manganese-zinc ferrite.

In ferroresonant high voltage transformer 20, the fractional change in ultor voltage output at terminal U, $\Delta U/U$, is closely related to the fractional change in Bsat, $\Delta Bsat/Bsat$, over the temperature range 20° C. to 100° C. The small fractional change of Bsat that is the property of lithium-bismuth ferrite, therefore, makes the lithium-bismuth ferrite a suitable magnetizable material to form the secondary core section 120b of ferroresonant high voltage transformer 20. The solid-line curve L of FIG. 3 illustrates the fractional change $\Delta U/U$ of a television receiver ultor voltage over the temperature range 20° C. to 100° C. when using the inventive circuit of FIG. 1, wherein the magnetizable material of the secondary core portion 120b is formed, illustratively, of lithium-bismuth ferrite, and wherein, for reasons to be explained below, the primary core section 120a is formed, illustratively, of a manganese-zinc ferrite. As indicated by curve L of FIG. 3, the fractional change in ultor voltage over a typical secondary core section operating range of 20° C. to 100° C. is $\Delta U/U = -0.035$. Thus, over an 80° C. range in temperature, the ultor voltage changes only about 3.5%.

In contrast, a ferroresonant high voltage transformer similarly constructed but with a one-material core formed of, illustratively, manganese-zinc ferrite, has a substantially higher fractional change in ultor voltage over the temperature range 20° C. to 100° C. A one-material core transformer has the afore-described curve characteristic of curve M of FIG. 3 wherein the fractional change of ultor voltage is about $-0.18$ or about a five-fold greater fractional change of ultor voltage than the two-material core transformer 20 of FIG. 1.

By using a two-material core for ferroresonant high voltage transformer 20, wherein the saturating secondary core section material is formed of a Bsat temperature stable material such as lithium-bismuth ferrite, a smaller fractional decrease in ultor voltage occurs from initial television turn-on to when final equilibrium operating temperature is established in the saturating core secondary section. Curve LV of FIG. 4 illustrates ultor voltage versus time from turn-on of the television receiver for a two-material core ferroresonant high voltage transformer 20 of FIG. 1 embodying the invention, wherein the saturating secondary core section material is lithium-bismuth ferrite and the primary core section material is manganese-zinc ferrite.

At time $t_0$, almost immediately after television receiver turn-on, the ultor voltage is about 31.5 kilovolt. This voltage decreases by only a small amount as the saturating secondary core section heats up, and at time $t_1$, when equilibrium operating temperature is established in the secondary core section, the ultor voltage is about 30.5 kilovolts.

In contrast, a one-material ferroresonant high voltage transformer core of illustratively manganese-zinc ferrite constructed to provide about the same output voltages at television receiver turn-on as the aforementioned two-material core transformer has an ultor voltage versus time from turn-on relationship illustrated by the dashed-line waveform MV of FIG. 4, previously referred to. Starting from approximately the same ultor voltage near television receiver turn-on at time $t_0$, the one-material core ferroresonant high voltage transformer produces a significantly lower ultor voltage of 28 kilovolts when equilibrium operating temperature is obtained at time $t_1$.

It should be further noted that the two-material core ferroresonant high voltage transformer embodying the invention achieves a smaller ultor voltage drop from turn-on to equilibrium temperature operation despite the fact that the equilibrium temperature of the saturating secondary core section of the two-material core transformer, as illustrated by the curve LT of FIG. 4, is higher than that for a one-material manganese-zinc ferrite core transformer. As illustrated in FIG. 4, the equilibrium operating temperature at time $t_1$ for the two-material core transformer is 140° C., whereas the equilibrium operating temperature for the one-material core transformer is lower at about 75° C. Thus, even though the two-material core transformer has a higher equilibrium operating temperature, it exhibits a smaller fractional change in ultor voltage from the time of television receiver turn-on to the time when equilibrium operating temperature is established.

Figure 5:
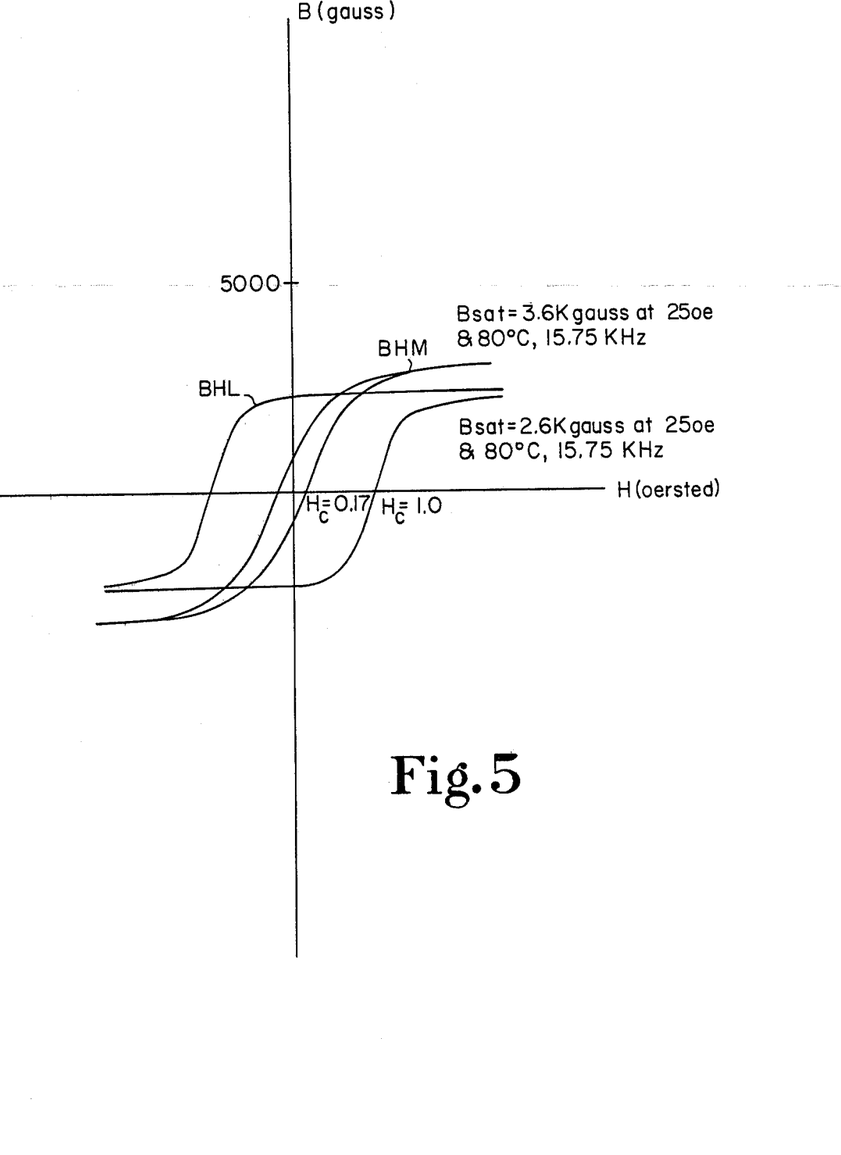

The higher equilibrium operating temperature for the two-material core transformer may be due to the greater losses sustained in a lithium-bismuth ferrite material as the core material magnetic operating point traverses its associated major B-H loop. FIG. 5, curve BHL, illustrates the major B-H loop of lithium-bismuth ferrite when measured at 15.75 KHz and at an equilibrium operating temperature of 80° C. The Bsat of lithium-bismuth ferrite is about 2.6 kilogauss, assuming, arbitrarily, that saturation flux density is reached at a magnetizing force H of 25 oersted. The coercivity $H_c$ of lithium-bismuth ferrite is 1.0 oersted. The curve BHM illustrates the major B-H loop of manganese-zinc ferrite. The Bsat of manganese-zinc ferrite is about 3.6 kilogauss, assuming arbitrarily that saturation flux density is reached at a magnetizing force H of 25 oersted. The coercivity $H_c$ of manganese-zinc ferrite is 0.17 oersted, approximately six times smaller than the coercive force of lithium-bismuth ferrite.

The area encompassed by a major B-H loop of a given magnetizable material represents the per unit volume hysteresis and eddy current losses sustained in the material each cycle of traversing the loop. As illustrated in FIG. 5, lithium-bismuth ferrite sustains greater losses per unit volume than does manganese-zinc ferrite. Thus, the two-material core ferroresonant high voltage transformer 20 using lithium-bismuth as the saturating secondary core material sustains greater losses per unit volume of material than does a similarly constructed ferroresonant high voltage transformer using a single material manganese-zinc ferrite core providing approximately the same output voltages.

Another factor contributing to greater losses for the two-material core transformer is the fact that because lithium-bismuth ferrite has a lower Bsat than that of manganese-zinc ferrite, the two-material core transformer requires a greater secondary core section cross-sectional area when compared to that of a one-material manganese-zinc ferrite core transformer having approximately the same number of output winding turns. Thus, to achieve similar output voltages, the two-material core transformer using lithium-bismuth ferrite as the saturating secondary core material has a larger cross-sectional area and thus a larger volume than does a one-material core manganese-zinc ferrite transformer, assuming that they both have the same secondary core leg length. This larger volume is accompanied by a smaller increase in surface area needed for cooling by radiation or convection. Therefore, increased volume may result in a higher equilibrium operating temperature for the two-material core transformer.

Nevertheless, despite the higher equilibrium operating temperature in a two-material core ferroresonant high voltage transformer using illustratively lithium-bismuth ferrite as the saturating secondary core material, the fractional change in Bsat and in ultor voltage is still less than a comparably constructed transformer using only manganese-zinc ferrite illustratively as the core material.

A feature of the invention is the increased flexibility afforded in designing a ferroresonant high voltage transformer when using two different magnetizable materials for the primary core section 120a and the secondary core section 120b. The secondary core section magnetizable material may be selected for the beneficial property of having a relatively temperature stable saturation flux density. However, since the primary core section 120a is operated in the linear region of its material B-H loop characteristic, the property of saturation flux density temperature stability is not a substantial factor when considering the type of material to use as the primary core section material.

Factors to consider in selecting a magnetizable material for the primary core section are those of relatively low hysteresis and eddy current losses to increase transformer efficiency, and a relatively high permeability to provide a reduction of $I^2R$ losses in primary winding 20a and in the output switching elements of inverter 22.

By using a two-material core, in accordance with the invention, the primary core material may be selected as illustratively manganese-zinc ferrite which has relatively low loss and high permeability whereas the saturating secondary core material may be selected to provide relatively temperature stable output voltages by selecting the secondary core material as illustratively lithium-bismuth ferrite.

Furthermore, by using a two-material, core, the bulk of the core comprises primary core section 120a and may be formed of a relatively inexpensive material, whereas the saturating secondary core section 120b may be formed of a material having a temperature stable Bsat even though such a material may be more expensive than the primary core section material.

In FIG. 1, ferroresonant transformer core 120 is constructed of two pieces, a C-core piece for the primary core section 120a and a straight, I-core slab for the saturating secondary core section 120b. Output windings 20b–20f may be wound over an insulating bobbin and the slab core section 120b inserted through the bobbin opening before assembly of the two core pieces. Primary winding 20a, however, is wound directly over the center portion of the C-core piece with insulating layers located between the layers of primary winding conductor turns and between the first primary winding layer and the C-pore piece.

Figure 6:
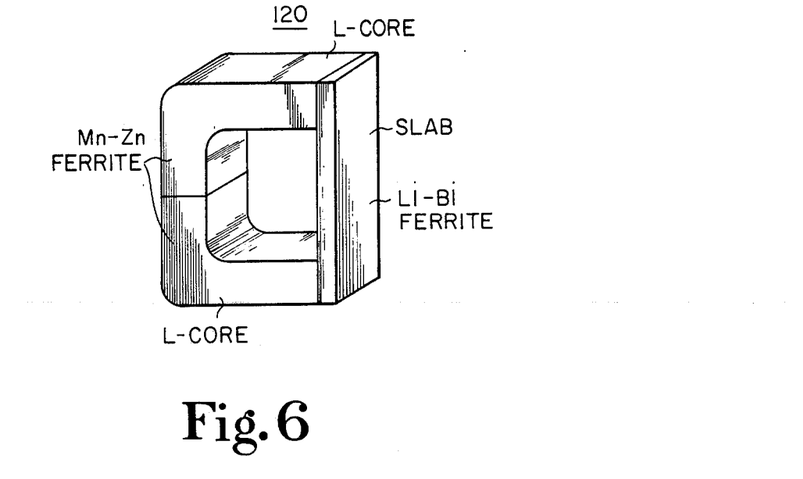
FIGS. 6 and 7 illustrate alternative core configurations of the ferroresonant transformer of FIG. 1.

FIG. 6 illustrates a construction of core 120 which also permits primary winding 20a to be wound over an insulating bobbin. In FIG. 6, core 120 is formed of three pieces. Two L-core pieces form the primary core section and a slab piece forms the secondary core section. Corresponding legs of the L-core pieces are inserted through opposite ends of the primary winding bobbin before the three piece core 120 is assembled.

Figure 7:
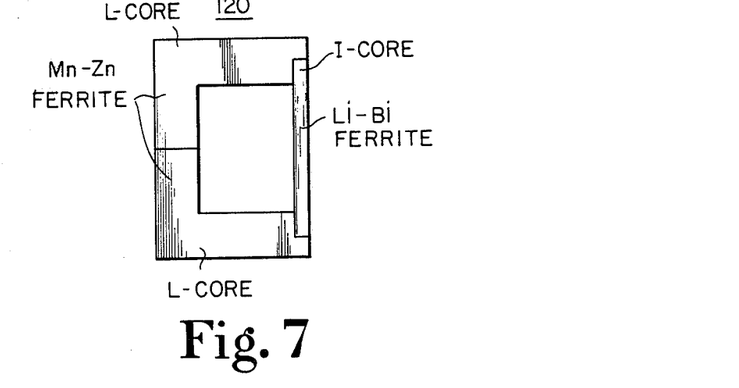

FIG. 7 is a variation of the three piece core construction of FIG. 6 wherein each of the L-core pieces is notched at the end of a leg to accept the saturating slab piece. To assemble the three pieces of FIG. 7 together after bobbin insertions, a plastic strap is wrapped around all three pieces and tightened, thereby effectively holding the pieces together as a single unit.

ILLUSTRATIVE VALUES FOR AN EMBODIMENT OF FERRORESONANT TRANSFORMER 20 OF FIG. 1

Core 120: C-I shape, with a window length of 1.75 inch, and a window buildup height of 0.84 inch. C-core section 120a comprises two L-shaped pieces. Cross-sectional area of center of primary core section 120a is 0.323 square inch. Dimensions of I-slab piece secondary core section 120b are—length of 2 9/16 inch, width of ⅝ inch and thickness of 0.145 inch.

Primary winding 20a: Wound on an insulating bobbin having an I.D. of 23/32 inch, an O.D. of ⅞ inch, and a length of 1.5 inch. Winding 20a comprises 3 layers of 200 turns total, #24 gauge enamel copper wire, bifilarly wound and provided with a center termination; winding length of travel of 1 3/16 inch.

Winding 20g: A single turn of #24 gauge enamel copper wire wrapped around one end of winding 20a.

High voltage winding 20f: Wound on an insulating bobbin having an I.D. of 1.25 inch and an O.D. of 1 13/16 inch. Winding 20f comprises 4,000 turns total of #38 gauge enamel copper wire in 28 layers of approximately 143 turns per layer and with 3 mil thick and 1 inch wide mylar insulation between layers. Winding length of travel of 0.7 inch. The self-resonant air-core frequency of winding 20f when potted in an epoxy compound is 38 KHz. The air-core inductance of winding 20f is 0.575 henry and the distributed winding capacitance is 27.5 pF.

Secondary output windings 20b-20d: Assembled on an insulating secondary winding bobbin which fits inside the bobbin of high voltage winding 20f. Bobbin I.D. is 23/32 inch, bobbin O.D. is 1 1/16 inch, bobbin length is 1.375 inch, distance between bobbin O.D. and I.D. of the high voltage winding bobbin is 0.157 inch. The first layer of wire wound over the secondary winding bobbin is winding 20d comprising 95 turns of #30 gauge, enamel copper wire, all turns uniformly spaced to fill bobbin length of 1.375 inch. The second layer of wire is winding 20e comprising 57 turns of #28 gauge, enamel copper wire. 29 turns are uniformly wound beginning at one end of the bobbin and then wound over the first ⅝ length of the bobbin; the remaining 28 turns are uniformly wound over the last ⅝ length of the bobbin. The third layer of wire is winding 20b comprising 12 bifilarly wound turns (24 turns total) of #28 gauge, enamel copper wire, each wire pair of the 12 turns uniformly spaced from another pair to fill the bobbin length. The fourth layer of wire is winding 20c comprising 4 bifilarly wound turns (8 turns total) of #28 gauge, enamel copper wire, each wire pair of the 4 turns uniformly spaced from another pair to fill the bobbin length. Mylar insulation, 3 mil thick and 1.375 inch wide is inserted between each of the four wire layers. The high voltage and secondary windings and bobbins are assembled together then placed in a mold and potted with an epoxy resin compound.

Magnetizable material of primary core section 120a: Manganese-zinc ferrite such as RCA 540 ferrite aforementioned.

Magnetizable material of secondary core section 120b: A lithium-bismuth ferrite manufactured in accordance with the teachings of the aforementioned U.S. patent application of I. Gordon. Slab secondary core section 120b was manufactured as follows: 6.027 grams of lithium carbonate, 64.679 grams of ferric oxide and 2.121 grams of bismuth oxide were mixed together in isopropanol for two hours, filtered to remove the solvent, dried and then calcined for two hours in oxygen at 900° C. The resultant material was ball milled for 24 hours, vacuum filtered, dried, and 3 percent by weight of a binder, such as paraffin, added. The mixture was then pressed in a steel die under a pressure of 10,000 pounds per square inch to the desired I-slab shape. After pressing, the material was sintered in oxygen at 1275° C. to 1300° C., cooled to 900° C. and maintained at 900° C. for 12 hours. Then the material was cooled to room temperature. The resultant slab, if need be, is ground down to the appropriate size for use as secondary core section 120b.

What is claimed is:

1. Apparatus for a television display including an ultor voltage power supply and a saturating core regulating transformer capable of operating over a range of temperatures without thereby being subject to undesirably large changes in an output voltage of said transformer, comprising:
   a magnetizable core including first and second core sections;
   a plurality of windings including a first winding wound on said first core section and arranged for coupling to a source of exciting current for generating a magnetic flux in said magnetizable core, a second one of said plurality of windings being wound on said second core section such that magnetic flux that links said second winding develops an alternating polarity output voltage across said second winding;
   a capacitance coupled to one of said plurality of windings that is wound on said magnetizable core for developing a circulating current in the capacitance coupled winding to produce a magnetic flux that aids in substantially magnetically saturating at least a portion of said second core section during each polarity interval of said alternating polarity output voltage for regulating said output voltage, said first core section being operated in the magnetically unsaturated region of the B-H loop characteristic of the first core section magnetizable material,
   wherein the magnetizable material of the magnetically saturating second core section is selected to have a higher Curie temperature than that of the magnetizable material of the substantially nonsaturating first core section;
   an ultor terminal; and
   means including a high voltage rectifier arrangement coupled to said ultor terminal for developing an ultor voltage from said regulated output voltage.

2. Apparatus for a television display including a B+ scanning voltage power supply and a saturating core regulating transformer capable of operating over a range of temperatures without thereby being subject to undesirably large changes in an output voltage of said transformer, comprising:
   a deflection winding;
   a deflection generator energized by said B+ scanning voltage for generating deflection winding scanning current;
   a magnetizable core including first and second core sections;
   a plurality of windings including a first winding wound on said first core section and arranged for coupling to a source of exciting current for generating a magnetic flux in said magnetizable core, a second one of said plurality of windings being wound on said second core section such that magnetic flux that links said second winding develops an alternating polarity output voltage across said second winding;
   a capacitance coupled to one of said plurality of windings that is wound on said magnetizable core for developing a circulating current in the capacitance coupled winding to produce a magnetic flux that aids in substantially magnetically saturating at least a portion of said second core section during each polarity interval of said alternating polarity output voltage for regulating said output voltage, said first core section being operated in the magnetically unsaturated region of the B-H loop characteristic of the first core section magnetizable material, wherein the magnetizable material of the magnetically saturating second core section is selected to have a higher Curie temperature than that of the magnetizable material of the substantially nonsaturating first core section; and means coupled to said second winding for developing said B+ scanning voltage from said regulated output voltage.

3. Apparatus for a television display including an ultor voltage power supply and a saturating core regulating transformer capable of operation over a range of temperatures without thereby being subject to undesirably large changes in an output voltage of said transformer, comprising:

a magnetizable core including first and second core sections;

a plurality of windings including a first winding wound on said first core section and arranged for coupling to a source of exciting current for generating magnetic flux in said first core section, a second one of said plurality of windings being wound on said second core section such that magnetic flux that links said second winding develops an alternating polarity output voltage across said second winding;

a capacitance coupled to one of said plurality of windings that is wound on said magnetizable core for developing a circulating current in the capacitance coupled winding to produce a magnetic flux that aids in substantially magnetically saturating said second core section during each polarity interval of said alternating polarity output voltage for regulating said output voltage, said first core section being operated substantially in the magnetically unsaturated region of the B-H loop characteristic of the first core section magnetizable material, wherein the magnetizable material of the magnetically saturating second core section is selected to be a material having a smaller fractional change in saturation flux density than that of the material of the nonsaturating first core section within the range of temperatures that may exist in the saturating portion of said second core section during operation of said transformer;

an ultor terminal; and means including a high voltage rectifier arrangement coupled to said ultor terminal for developing an ultor voltage from said regulated output voltage.

4. Apparatus for a television display including a B+ scanning voltage power supply and a saturating core regulating transformer capable of operation over a range of temperatures without thereby being subject to undesirably large changes in an output voltage of said transformer, comprising:

a deflection winding;

a deflection generator energized by said B+ scanning voltage for generating deflection winding scanning current;

a magnetizable core including first and second core sections;

a plurality of windings including a first winding wound on said first core section and arranged for coupling to a source of exciting current for generating magnetic flux in said first core section, a second one of said plurality of windings being wound on said second core section such that magnetic flux that links said second winding develops an alternating polarity output voltage across said second winding;

a capacitance coupled to one of said plurality of windings that is wound on said magnetizable core for developing a circulating current in the capacitance coupled winding to produce a magnetic flux that aids in substantially magnetically saturating said second core section during each polarity interval of said alternating polarity output voltage for regulating said output voltage, said first core section being operated substantially in the magnetically unsaturated region of the B-H loop characteristic of the first core section magnetizable material, wherein the magnetizable material of the magnetically saturating second core section is selected to be a material having a smaller fractional change in saturation flux density than that of the material of the nonsaturating first core section within the range of temperatures that may exist in the saturating portion of said second core section during operation of said transformer; and means coupled to said second winding for developing said B+ scanning voltage from said regulated output voltage.

5. Apparatus for a television display according to claim 3 wherein the magnetizable material of the magnetically saturating second core section is further selected to have a higher Curie temperature than that of the magnetizable material of the substantially nonsaturating first core section.

6. Apparatus for a television display according to claim 4 wherein the magnetizable material of the magnetically saturating second core section is further selected to have a higher Curie temperature than that of the magnetizable material of the substantially nonsaturating first core section.

7. Apparatus for a television display according to claims 1, 2, 3, 4, 5 or 6 wherein said second core section magnetizable material comprises a lithium ferrite and wherein said first core section magnetizable material comprises a ferrite material other than lithium ferrite.

8. Apparatus for a television display according to claim 7 wherein the frequency of said source of exciting current equals or is greater than the horizontal deflection frequency.

9. Apparatus for a television display according to claim 8 wherein said first core section comprises one leg of said magnetizable core and said second core section comprises another leg.

10. A ferroresonant high voltage power supply for a television display requiring a DC ultor high voltage, comprising:

a source of alternating input voltage;

a ferroresonant transformer having a magnetizable core and a plurality of windings wound on said core including a primary winding wound on a primary core section of said magnetizable core and a secondary winding wound on a secondary core section of said magnetizable core, said primary winding being coupled to said source for developing an alternating polarity output voltage across said secondary winding; and a capacitance coupled to one of said plurality of windings that aids in magnetically saturating said secondary core section during each polarity interval of said alternating polarity output voltage for regulating said output voltage; and a high voltage circuit responsive to said regulated output voltage for developing a regulated DC ultor high voltage, wherein said primary and secondary core sections are selected of different magnetizable materials such that said secondary core section material has a higher Curie temperature than that of said primary core section material to provide relatively little ultor high voltage change with operating temperature variations of said ferroresonant transformer.

11. A ferroresonant high voltage power supply according to claim 10 including means responsive to said regulated output voltage for developing a B+ scanning voltage, a deflection winding and a deflection generator energized by said B+ scanning voltage for generating scanning current in said deflection winding.

12. A ferroresonant high voltage power supply according to claims 10 or 11 wherein said secondary core section material comprises lithium ferrite and said primary core section material comprises a ferrite other than lithium ferrite.

13. A ferroresonant high voltage power supply according to claim 12 wherein said high voltage circuit comprises a high voltage winding wound on said secondary core section for stepping up said regulated output voltage and rectifying means coupled to said high voltage winding for developing said ultor high voltage at an output terminal of said rectifying means.

14. A ferroresonant high voltage power supply according to claim 13 wherein the frequency of said alternating input voltage equals or is greater than the horizontal deflection frequency.

15. A ferroresonant high voltage power supply according to claim 14 wherein said primary core section comprises one leg of said magnetizable core and said secondary core section comprises another leg.

16. A saturating core regulated ultor voltage power supply for a television capable of operation over a range of temperatures without thereby being subject to undesirably large changes in ultor voltage, comprising:

a source of input voltage;

means coupled to said source for developing an exciting current;

a saturable reactor including a magnetizable core and a first winding located on said core;

means coupled to said exciting current developing means for generating a magnetic flux in said magnetizable core that links said first winding to develop an alternating polarity output voltage;

a capacitance responsive to said output voltage for generating a magnetic flux in a core section associated with said first winding that aids in magnetically saturating said associated core section to regulate said alternating polarity output voltage, another core section of said magnetizable core being operated substantially in the linear region of the B-H characteristic of that other core section material, wherein the magnetizable material of the magnetically saturating core section is selected to be a material having a higher Curie temperature than that of the material of the linear region operated core section;

an ultor terminal; and means including a high voltage rectifier arrangement coupled to said ultor terminal and responsive to said regulated output voltage for developing a regulated ultor voltage at said ultor terminal.

17. A saturating core regulated B+ scanning voltage power supply for a deflection generator capable of operation over a range of temperatures without thereby being subject to undesirably large changes in B+ scanning voltage, comprising:

a deflection winding;

a deflection generator energized by said B+ scanning voltage for generating deflection winding scanning current;

a source of input voltage;

means coupled to said source for developing an exciting current;

a saturable reactor including a magnetizable core and a first winding located on said core;

means coupled to said exciting current developing means for generating a magnetic flux in said magnetizable core that links said first winding to develop an alternating polarity output voltage;

a capacitance for developing a circulating current that generates a magnetic flux in a core section associated with said first winding that aids in magnetically saturating said associated core section to regulate said alternating polarity output voltage, another core section of said magnetizable core being operated substantially in the linear region of the B-H characteristic of that other core section material, wherein the magnetizable material of the magnetically saturating core section is selected to be a material having a higher Curie temperature than that of the material of the linear region operated core section; and means coupled to said deflection generator and responsive to said regulated output voltage for developing said B+ scanning voltage as a regulated voltage.

18. A saturating core regulated ultor voltage power supply for television capable of operation over a range of temperatures without thereby being subject to undesirably large changes in ultor voltage, comprising:

a source of input voltage;

means coupled to said source for developing an exciting current;

a saturable reactor including a magnetizable core and a first winding located on said core;

means coupled to said exciting current developing means for generating a magnetic flux in said magnetizable core that links said first winding to develop an alternating polarity output voltage;

a capacitance for developing a circulating current that generates a magnetic flux in a core section associated with said first winding that aids in magnetically saturating said associated core section to regulate said alternating polarity output voltage, another core section of said magnetizable core being operated substantially in the linear region of the B-H characteristic of core section material, wherein the magnetizable material of the magnetically saturating core section is selected to be a material having a smaller fractional change in saturation flux density than that of the material of the linear region operated core section within the range of temperatures that exist in the saturating core section during operation of said power supply;

an ultor terminal; and means including a high voltage rectifier arrangement coupled to said ultor terminal and responsive to said regulated output voltage for developing a regulated ultor voltage at said ultor terminal.

19. A saturating core regulated B+ sanning power supply for a deflection generator capable of operation over a range of temperatures without thereby being subject to undesirably large changes in B+ scanning voltage, comprising:

a deflection winding;

a deflection generator energized by said B+ scanning voltage for generating deflection winding scanning current;

a source of input voltage;

means coupled to said source for developing an exciting current;

a saturable reactor including a magnetizable core and a first winding located on said core;

means coupled to said exciting current developing means for generating a magnetic flux in said magnetizable core that links said first winding to develop an alternating polarity output voltage;

a capacitance responsive to said output voltage for generating a magnetic flux in a core section associated with said first winding that aids in magnetically saturating said associated core section to regulate said alternating polarity output voltage, another core section of said magnetizable core being operated substantially in the linear region of the B-H characteristic of core section material, wherein the magnetizable material of the magnetically saturating core section is selected to be a material having a smaller fractional change in saturation flux density than that of the material of the linear region operated core section within the range of temperatures that exist in the saturating core section during operation of said power supply; and means coupled to said deflection generator and responsive to said regulated output voltage for developing said B+ scanning voltage as a regulated voltage.

20. A power supply according to claim 19 including an ultor terminal and means including a high voltage rectifier arrangement coupled to said ultor terminal and responsive to said regulated output voltage for developing a regulated ultor voltage at said ultor terminal.

21. A power supply according to claims 18, 19 or 20 wherein the material of the magnetically saturating core section is further selected to be a material having a higher Curie temperature than that of the material of the linear region operated core section.

22. A power supply according to claim 21 wherein the magnetically saturating core section material comprises a lithium ferrite and wherein the linear region operated core section comprises a ferrite other than lithium ferrite.

* * * * *

UNITED STATES PATENT AND TRADEMARK OFFICE
CERTIFICATE OF CORRECTION

PATENT NO. : 4,390,819

DATED : June 28, 1983

INVENTOR(S) : William E. Babcock, et al.

It is certified that error appears in the above-identified patent and that said Letters Patent is hereby corrected as shown below:

Column 11, Line 37

That portion reading "5/8" should read -- 1/3 --

Column 11, Line 38

That portion reading "5/8" should read -- 1/3 --

Signed and Sealed this

Fourth Day of October 1983

[SEAL]

Attest:

GERALD J. MOSSINGHOFF

Attesting Officer     Commissioner of Patents and Trademarks